US006557583B2

(12) United States Patent
McCabe

(10) Patent No.: US 6,557,583 B2
(45) Date of Patent: May 6, 2003

(54) ELECTRIC POWER MODULATED LEAD SCREW ACTUATED DAMPERS AND METHODS OF MODULATING THEIR OPERATION

(76) Inventor: Francis J. McCabe, #6 Bunker Hill Rd., Ottville, PA (US) 18942

( * ) Notice: Subject to any disclaimer, the term of this patent is extended or adjusted under 35 U.S.C. 154(b) by 8 days.

(21) Appl. No.: 09/919,437

(22) Filed: Jul. 31, 2001

(65) Prior Publication Data

US 2001/0055947 A1 Dec. 27, 2001

Related U.S. Application Data

(63) Continuation-in-part of application No. 09/733,380, filed on Apr. 29, 2000, now Pat. No. 6,447,393, which is a continuation-in-part of application No. 09/379,032, filed on Aug. 23, 1999, now Pat. No. 6,224,481.

(51) Int. Cl.[7] .................................... F16K 31/04

(52) U.S. Cl. ............................ 137/601.09; 74/89.38; 251/228; 254/369

(58) Field of Search ...................... 454/369; 251/228; 74/89.38, 89.39; 137/601.08, 601.09, 601.11, 601.12, 601.14

(56) References Cited

U.S. PATENT DOCUMENTS

| | | | | |
|---|---|---|---|---|
| 4,008,877 A | * | 2/1977 | Yasuoka et al. | 251/229 |
| 4,075,898 A | * | 2/1978 | Carlson, Jr. | 74/50 |
| 5,779,540 A | * | 7/1998 | Nailor | 137/79 |
| 5,833,529 A | * | 11/1998 | Jacob | 251/129.12 |

* cited by examiner

*Primary Examiner*—Stephen M. Hepperle
(74) *Attorney, Agent, or Firm*—Frank J. Benasutti

(57) ABSTRACT

A damper assembly in which the position of the damper blades is controlled by an electric powered actuator. The powered actuator rotates a threaded lead screw shaft attached to an operator means attached to the damper blades of the damper, which causes the damper blades to open and close or be positioned somewhere in-between. The actuator can be controlled by sensors in a remote location. The actuator allows the damper to be modulated to set up pressure differentials and to be closed well in advance of oncoming smoke, fire, or other detected toxic fumes. There are a variety of nuts and gear arrangements coacting with the lead screw to drive the operator.

3 Claims, 14 Drawing Sheets

ELECTRIC POWER MODULATED LEAD SCREW ACTUATED DAMPERS AND METHODS OF MODULATING THEIR OPERATION

CROSS-REFERENCE TO RELATED APPLICATIONS

This application is a continuation-in-part of my prior application, Ser. No. 09/379,032, filed Aug. 23, 1999 entitled POWER MODULATING LEAD SCREW ACTUATED BUTTERFLY BLADE ACTION DAMPER, now U.S. Pat. No. 6,224,481 issued May 1, 2001, and a continuation-in-part of my prior application Ser. No. 09/733,380, filed Apr. 29, 2000, now U.S. Pat. No. 6,447,393, issued Sep. 10, 2002, for an ELECTRIC POWER MODULATED LEAD SCREW ACTUATED BUTTERFLY BLADE DAMPER AND METHOD OF CONTROLLING AIR FLOW AND PRESSURE AND PNEUMATIC TWO POSITION OPERATOR; which applications are incorporated herein as if fully set forth.

BACKGROUND OF THE INVENTION

1. Technical Field

This invention relates to air/smoke/fire dampers. In particular, it relates to dampers which can be controlled to be set and reset (i.e., closed and opened) locally or remotely under power, and which seal the damper under pressure when the damper blades are in the closed position; and which can be operated to be partially closed in order to modulate air flow and pressure levels.

2. Background Art

Multi-blade non-butterfly type dampers and butterfly dampers, which can be closed automatically upon actuation by a heat-sensitive or other device are well-known in the art. Some such dampers snap closed under either their own weight (i.e., gravity), or by mechanical force provided by springs. As the art developed, external controls were devised to activate these dampers. Further, controls were also developed to cause the damper to be reset, that is, to be reopened to a ready position for heat responsive actuation in the event of fire or smoke conditions. See, for example, U.S. Pat. Nos. 4,301,569; 4,442,862; 5,533,929; 5,728,001 and Re. 32,362.

A disadvantage of these prior art dampers is that they typically have imperfect release means. As a result, a substantial amount of smoke and even flames may pass through the damper; often before it is activated. It would be advantageous to have a damper system that could be activated more reliably in advance of the fire or smoke passing through the system, to more effectively prevent either from passing through the damper.

In addition to problems caused by complicated heat responsive closure means, dampers which are closed by gravity or spring driven devices do not always form an effective positive seal. As a result, even though the damper may be in the closed position, smoke and flames may pass through the damper and spread to other parts of the building. Thus, it would be desirable to have dampers that form a more effective seal, rather than merely temporarily containing either the fire or the progress of smoke.

Also, if the blades are pivoted on their longitudinal centers, the air and heat does not help to keep the blade seals shut. Rather, pressure on one side of the pivot axis of the blade tends to force it open, while pressure on the other tends to force it closed. It is, therefore, desirable to have a pivoted blade damper which is forced to an even tighter closed and sealed condition under pressure.

It is further desirable to have a damper system in which the damper can be partially closed or opened, in order to modulate the pressure in the system. For example, it may be desirable to have more pressure in one room than another and to be able to adjust the opening in the damper, say for example remotely, so as to affect the amount of air passing through it.

The prior art has failed to provide a damper which can be powered closed well before advancing smoke and fire arrives and have failsafe spring closure on power failure, which creates an effective seal; which can be sealed rapidly by a powered drive mechanism; and further which can be partially opened and closed to modulate the pressure in the system in which the damper is used. Also, the prior art does not have a simple two blade end pivoting damper, with a direct drive linkage (for round and rectangular dampers).

SUMMARY OF THE INVENTION

My invention comprises, among other things, a damper assembly in which operation of the damper blades is controlled by an electric powered actuator having a lead screw shaft. The actuator drives an operator means attached to the damper blades. The actuator causes cycling of the damper blades to move them between an open and a closed position, and/or causes them to be set in intermediate positions to set up controlled pressure environments by modulating the air flow through the damper.

In another preferred embodiment, a DC motor powered actuator drives the lead screw shaft to cycle the damper blades between the open, closed and intermediate positions.

In another embodiment, the actuator is self-controlled by a heat responsive device.

Also, a remote control system can communicate with the damper controls via a hard wired connection, or alternatively, via radio transmission.

This configuration provides for a better seal in the case of the fully closed position of the blades. In particular, the powered actuation lead screw shaft provides sufficient force to operate against heated air flow and to seal the damper tightly; which, in turn, prevents both smoke and fire from easily passing through the damper.

This design lends itself more readily to round or oval duct configurations.

My invention comprises an electric power operated damper assembly, comprising:

- a damper, having:
  - a damper frame and
  - at least one damper blade pivotally attached to the damper frame, to regulate the air
  - flow through the damper frame by movement of the blade;
- an operator means engaging the damper blade for moving the blade in response to movement of the operator means; and
- an electric powered actuator means, having a lead screw shaft powered for rotation about its axis; the electric powered actuator means engaging the operator means to cause the operator means to move the damper blade in response to movement of the actuator means.

It further comprises a powered operated damper assembly as described above, wherein the electric powered actuator means has an electric motor which is a DC stepper motor.

It further comprises an electric power operated damper assembly, wherein the electric powered actuator means is a cycling means for moving the lead screw shaft and causing the damper blade to move and cycle between various positions to modulate the air flow through the damper.

It further comprises an electric power operated damper assembly, wherein the powered actuator means further comprises a linkage means having a first portion thereof engaging the lead screw shaft to travel therealong in response to axial rotation of the shaft, and a second portion thereof engaging the operator means to move said damper blade in response to movement of said first portion alone said shaft.

It further comprises an electric power operated damper assembly wherein the first portion of the linkage means has a nut engaging the lead screw shaft to travel therealong.

It further comprises a electric power operated assembly, wherein the first portion of the linkage means has a gear mounted about the lead screw shaft; and the powered actuator means further comprises a solenoid means having a solenoid having a solenoid shaft movable to an extended and a retracted position; said solenoid being mounted in juxtaposition to said gear, so that in the extended position said solenoid shaft engages said gear and in the retracted position said solenoid shaft does not engage said gear, whereby when said solenoid shaft engages said gear, said gear travels along said lead screw shaft upon rotation of said lead screw about its axis.

It further comprises an an electric power operated damper assembly, wherein the power actuator means further comprises linkage means having a first portion thereof engaging the lead screw shaft to travel thereon to response to axial rotation of the shaft, said first portion of the linking means having a nut as a part thereof; and said power actuated means further comprises means to engage said nut to prevent its rotation whereby said nut travels along said lead screw shaft upon rotation of said lead screw shaft; and said linkage means further comprises a second portion thereof engaging the operator means to move said damper blade in response to movement of said nut along said lead screw shaft.

It further comprises a power operated damper assembly, further comprising:

a first blade travel sensor means juxtaposed to the lead screw shaft such that said sensor means notifies the powered actuator when the movable shaft has moved the damper blades to a first position; and a second blade travel switch attached to the movable shaft such that it notifies the powered actuator when the movable shaft has moved the damper blades to a second position.

It further comprises an electric powered damper assembly, further comprising a thermal lock attached to the damper assembly such that it does not restrict movement of the damper blades in normal operating conditions and does not restrict the movement of the damper blades in high temperature conditions to prevent the damper blades from moving from a closed to an opened position.

It further comprises a method of controlling air flow by opening and closing dampers with an electric powered damper actuator means, including steps of:

using a damper to control flow through a conduit, including the steps of:

juxtaposing a damper frame to a conduit;

pivotally attaching at least one damper blade to the damper frame to provide a position to allow air flow through said frame and a position to restrict air flow therethrough;

attaching an operator means to said blade to move said blade in response to movement of said operator means;

attaching to the operator means, a powered actuator means having an electric motor including a motor shaft, and a lead screw shaft rotatable about its axis in response to rotation of the motor shaft, such that when the lead screw shaft is moved it moves the damper blade between said positions.

It further comprises a method as described above, including the additional step of connecting a sensor to the powered actuator, the sensor having means to control activation of the powered actuator to control opening or closing of the damper when a sensed condition indicates that the damper should be opened or closed;

whereby the sensor controls air flow through the damper.

It further comprises a method as described above including the additional step of connecting a sensor to the powered actuator, the sensor having means to control activation of the powered actuator to control the position of the blades of the damper between opening or closing of the damper when a sensed condition indicates that the damper should be partially opened or closed;

whereby the sensor controls air flow through the damper.

It further comprises a method as described above, including the additional step of locating the sensor remotely from the damper;

whereby the sensor can activate the damper before a sensed condition triggering activation of the powered actuator reaches the damper.

DESCRIPTION OF THE PREFERRED EMBODIMENTS

Figure 1:
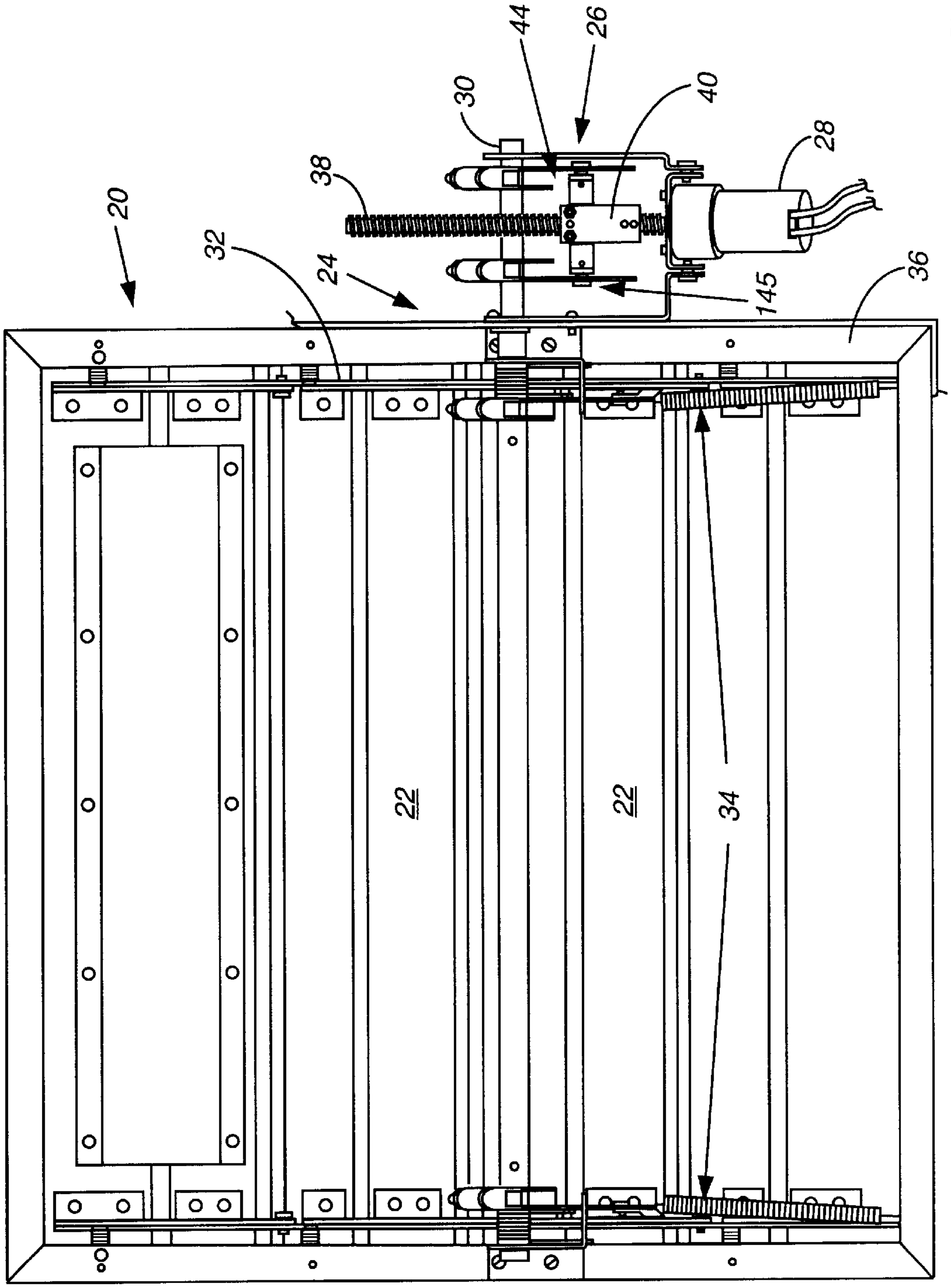
FIG. 1 is a rear elevation of a preferred embodiment of my invention.

Referring to the Figures, FIG. 1 shows a multi-blade damper 20 having horizontally rotatable blades 22 with an operator means designated generally 24 and lead screw actuator means designated generally 26 powered by an electric DC motor 28. The operator means 24 comprises a horizontally mounted operator shaft 30 and a linkage means 32, connected to the shaft and the blades 22 to open and close them. The blades also have a spring means designated generally 34 to help them close if power fails. The operator, linkage and spring means are well known in the prior art.

Figure 2:
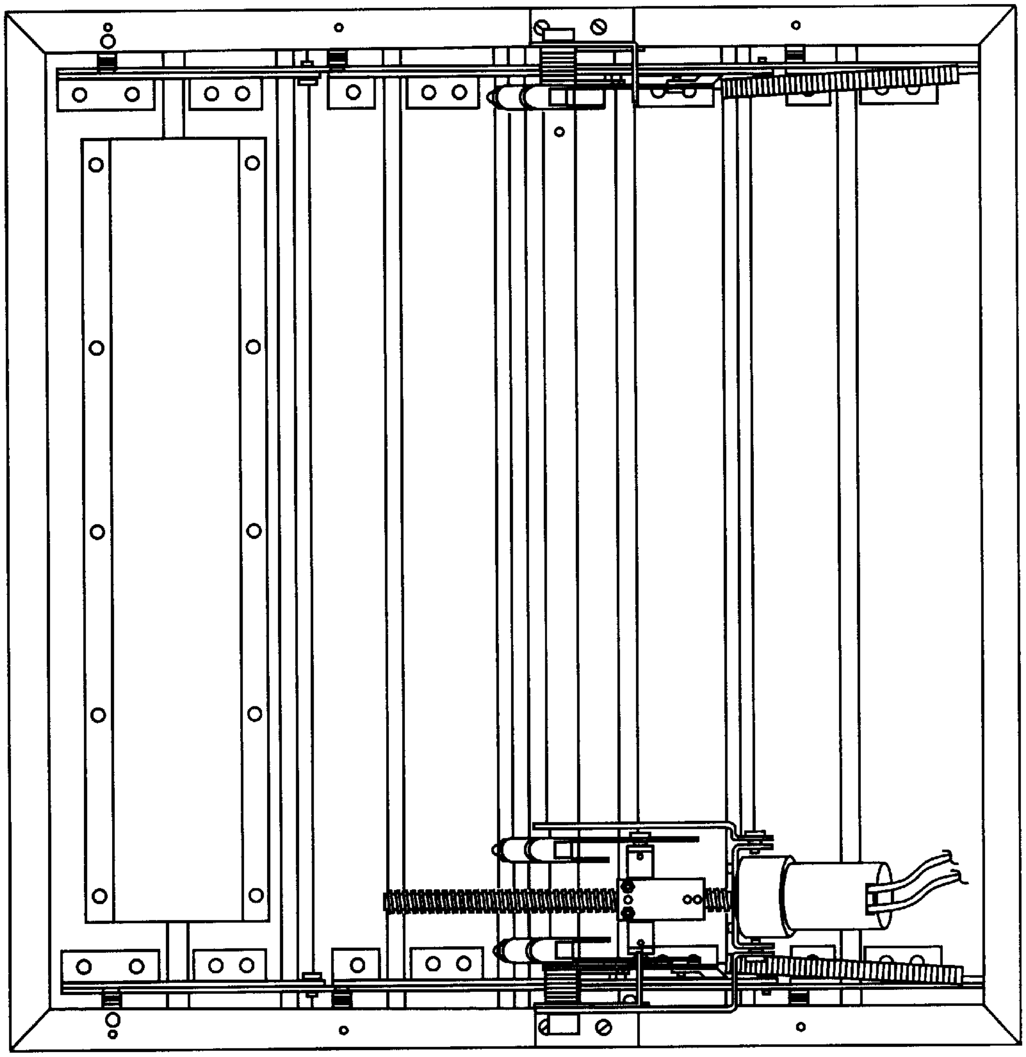
FIG. 2 is a rear elevation of an alternate embodiment of my invention.
Figure 3:
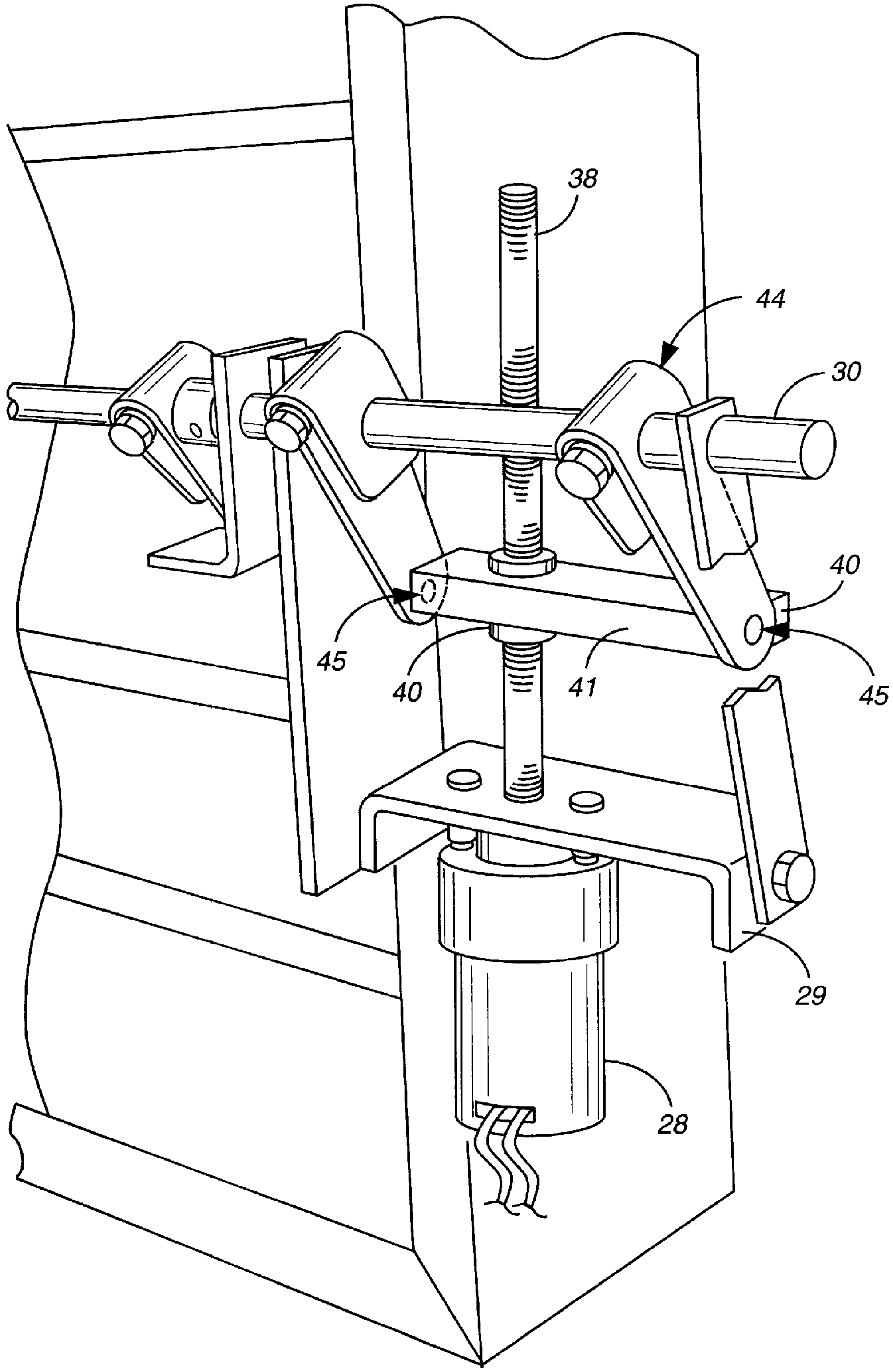
FIG. 3 is an enlarged perspective view of a portion of the preferred embodiment shown in FIG. 1.

The motor 28 is rotatably mounted to the frame 36 by an angled bracket 29, FIG. 3, and fixedly attached to the actuator shaft 30 to cause the shaft to rotate. The motor can be located within the envelope of the frame, as shown in FIG. 2, or outside the damper frame as shown in FIG. 1. Mounted to the motor shaft 42 is a lead screw 38 for rotation therewith about its axis. The lead screw passes through a nut 40 which can traverse the lead screw axially. The nut 40 has a bar 41 attached to it for movement with it. The bar 41 is rotatably mounted in the end of a yoke designated generally 44. That end of the yoke 44 travels with the nut 40 and bar 41 about and rotates about pivotal connections designated generally 45 at the end of the bar 41; as shown in the alternate position in FIG. 3. The other end of the yoke is fixedly connected to the actuator shaft 30. Thus, when the motor is turned on and the nut travels axially along the lead screw, the yoke 44 pivots and thereby rotates the actuator shaft 30.

In this embodiment, the motor and nut and lead screw arrangement prevents the damper from springing shut. In other words, the motor must close the damper as well as open it.

Figure 4:
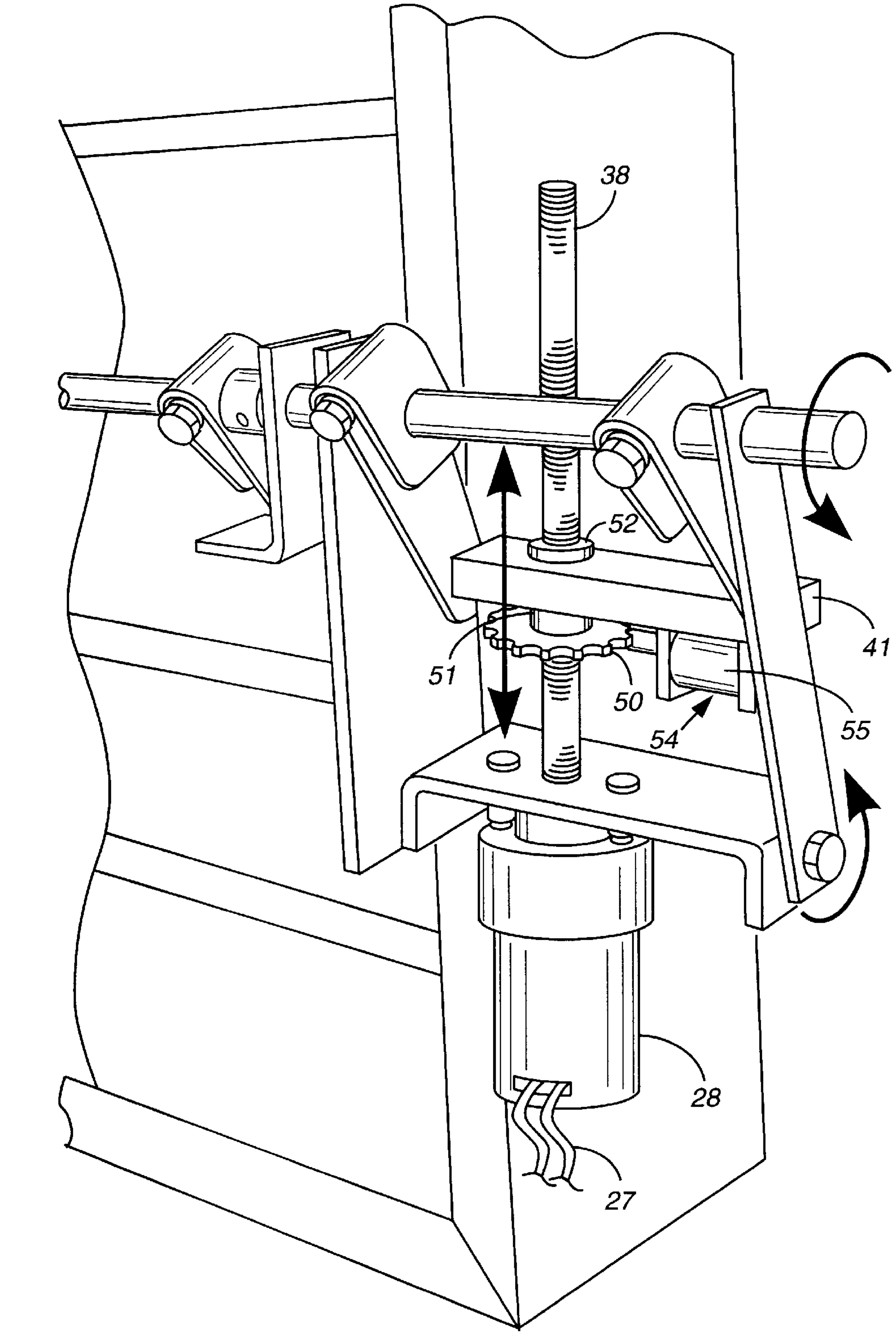
FIG. 4 is a perspective view of an alternate embodiment of my invention.
Figure 5:
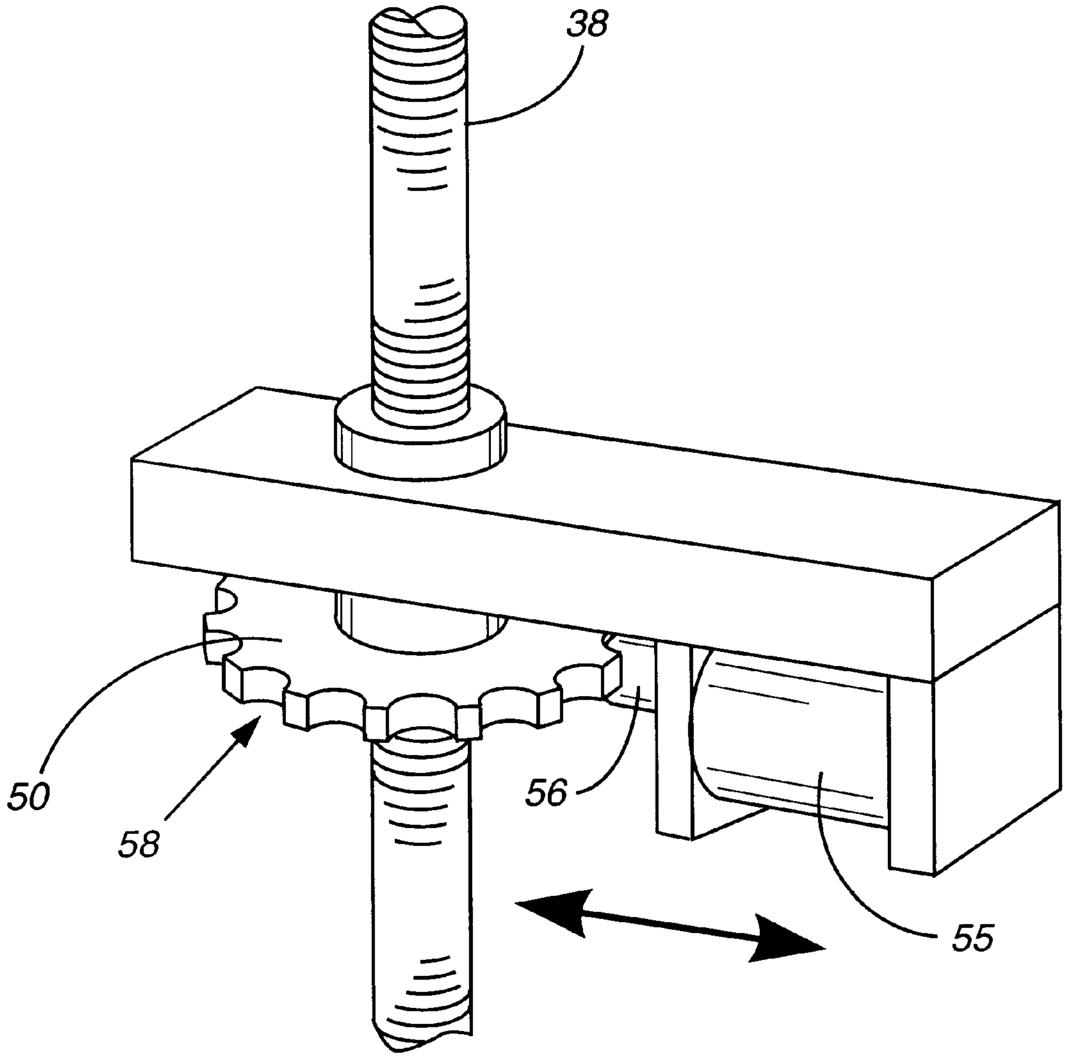
FIG. 5 is a perspective view of a portion of the alternate embodiment shown in FIG. 4.

In the alternate embodiment shown in FIGS. 4 and 5, the nut is replaced by a gear 50 mounted to rotate with the lead screw on bearings 51 and 52 on the bar 41. If the motor were supplied with power, it would simply spin the gear 50 and would not move the bar 41 to open the damper. However, a solenoid means designated generally 54 is fixedly mounted to the bar 41. The controls of the solenoid means are wired as at 27 directly to the motor 28. Thus, when the motor receives power, simultaneously the solenoid means receives power. The solenoid means includes a solenoid 55 which extends its shaft 56 into an interfering relationship with the teeth designated generally 58 of the gear 50; thus preventing the gear from turning. Accordingly, the gear will now travel along the shaft 38 (just as the nut did in the previous embodiment) and the damper will open or close. When power is stopped to the motor, it is also stopped to the solenoid means. The solenoid resets, i.e., retracts its shaft 56; thus moving its shaft out of engagement with the teeth of the gear. As a result, the damper can spring shut under the action of the spring means 34.

Figure 15:
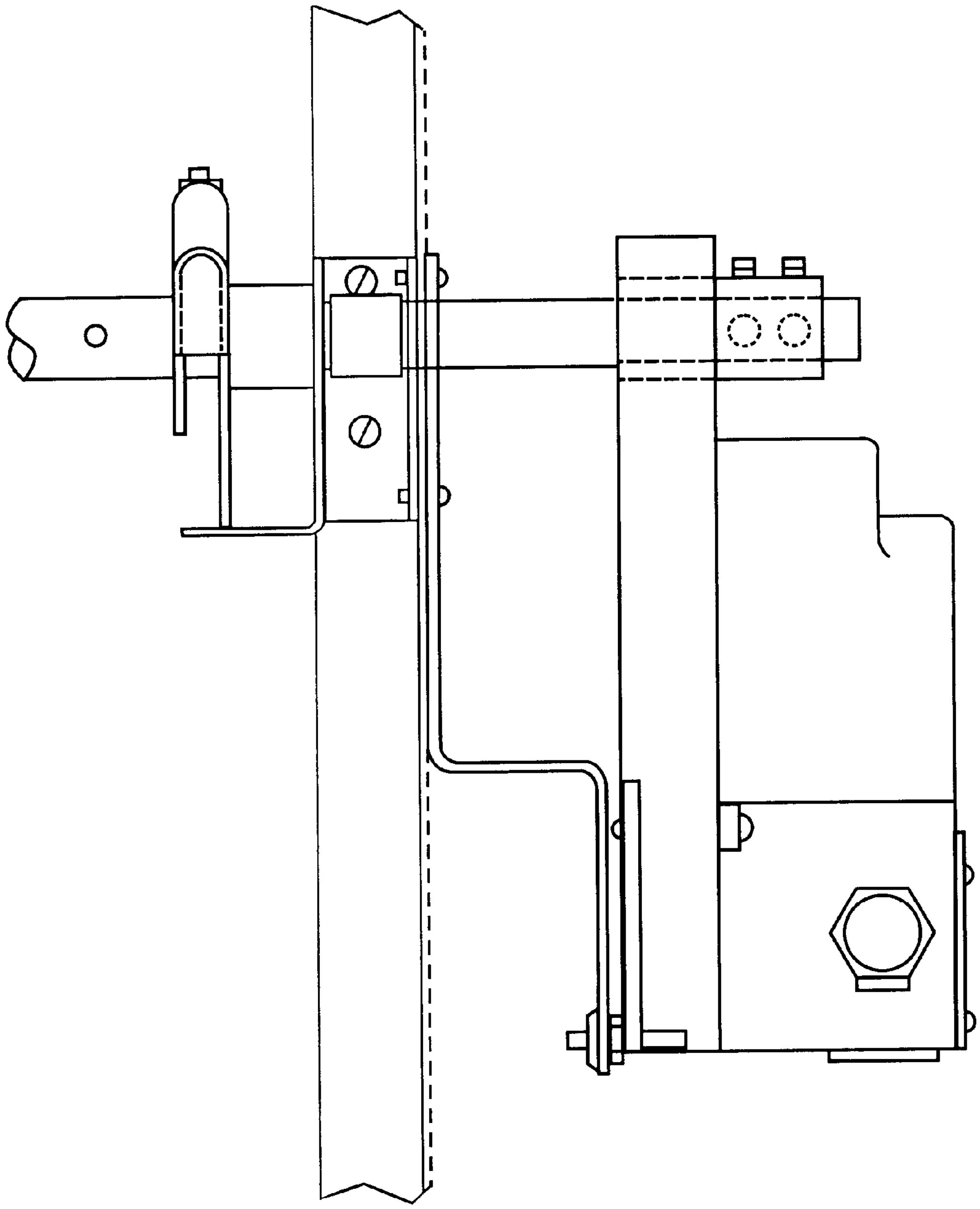
PRIOR ART FIG. 15
FIG. 15 is a view of the prior art.

In the prior art, as shown in FIG. 15, spring returned dampers simply had a motor mounted on the actuator shaft. These motors were large and cumbersome and often failed in the field.

Figure 6:
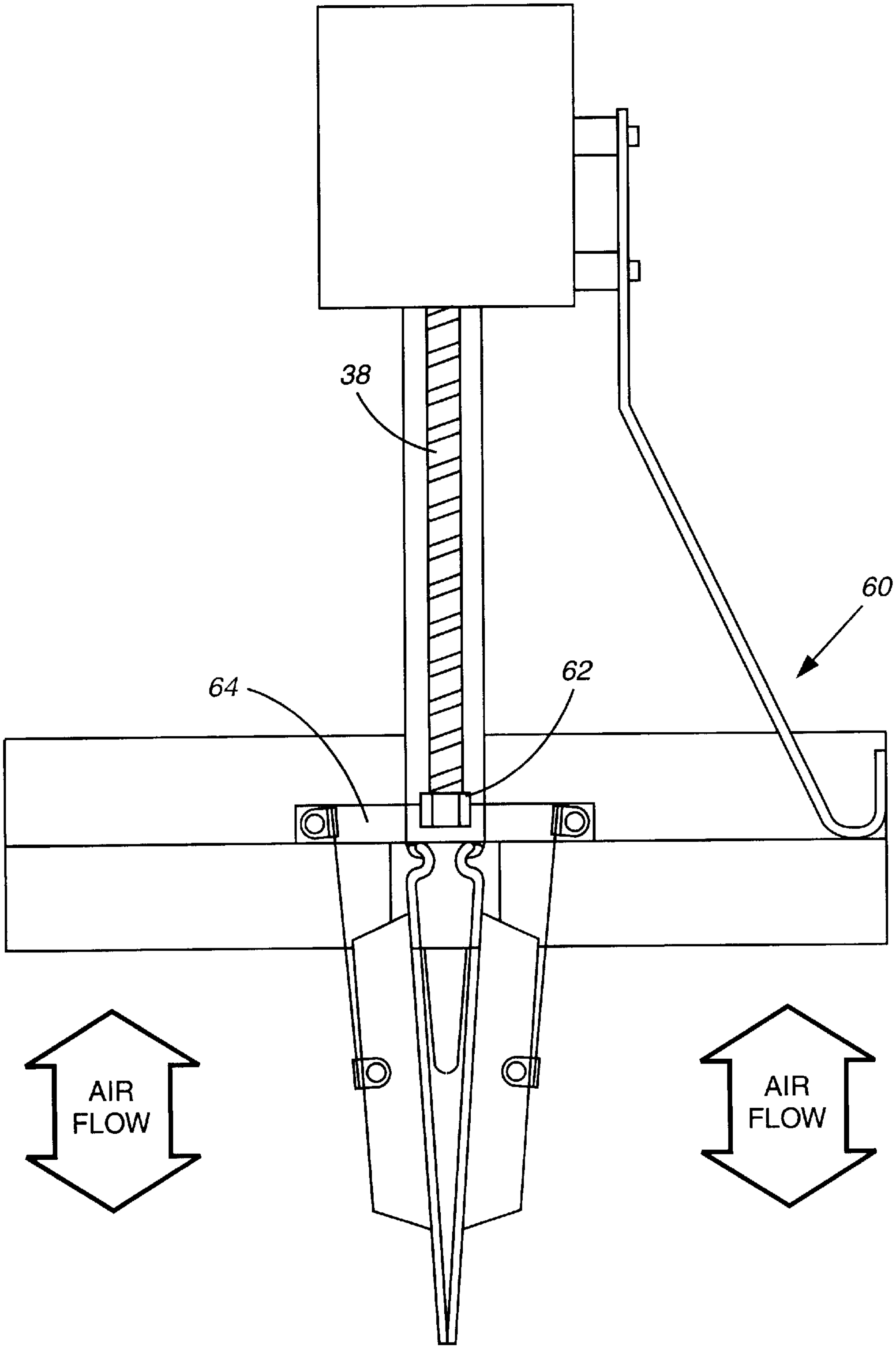
FIG. 6 is an inside vertical elevation of another embodiment of my invention.

The next embodiment is a butterfly damper designated generally 60 in FIG. 6. A nut 62 is fixed to a cross-brace 64. When the motor is actuated, the nut traverses the lead screw 38 and the damper is either opened or closed; as more fully described in my prior co-pending application.

Figure 7:
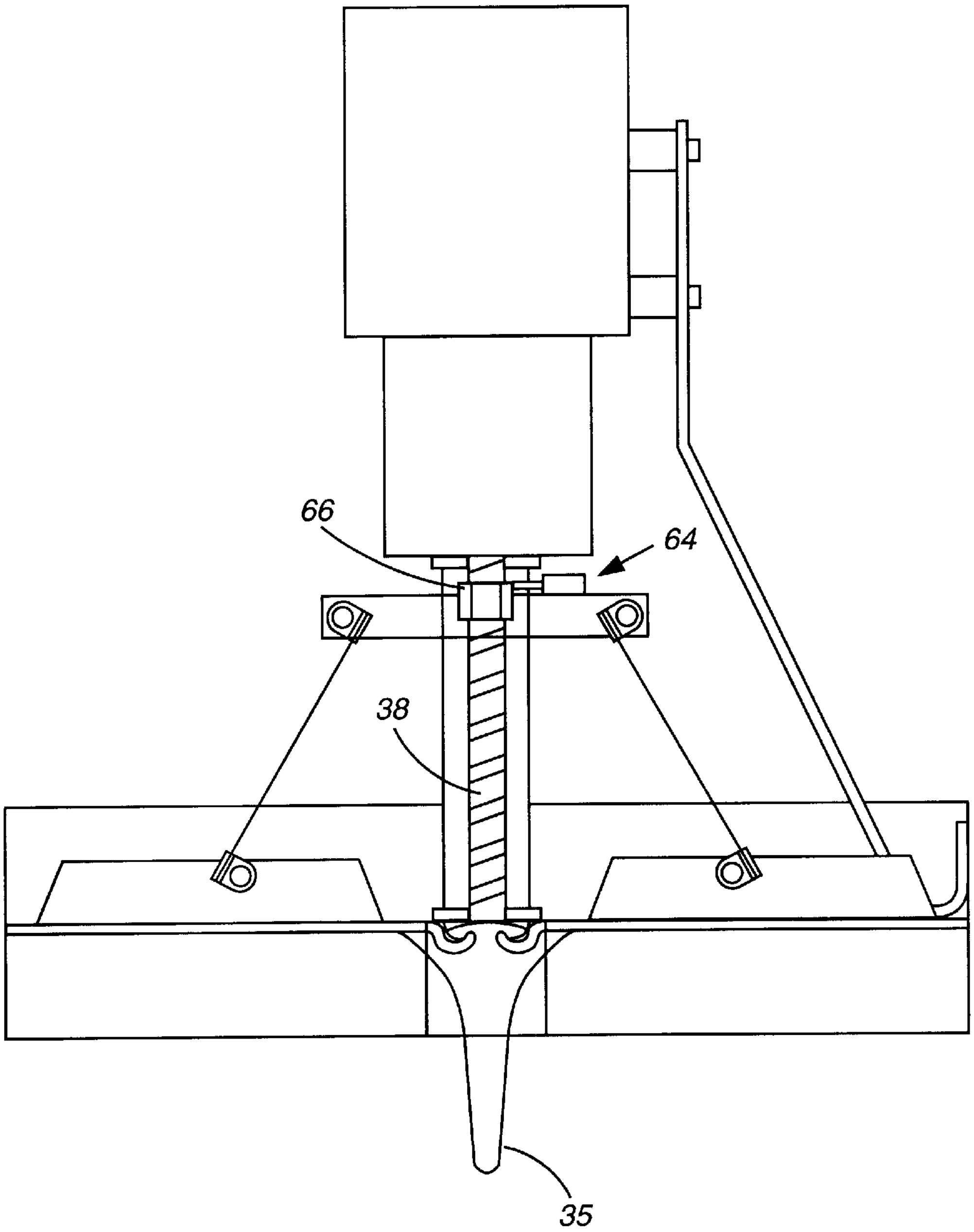
FIG. 7 is an inside vertical elevation of another embodiment of my invention.

The embodiment shown in FIG. 7 is a lead screw operated butterfly damper, but with a solenoid designated generally 64 to engage a nut 66 on the lead screw shaft 38. Thus, when the motor is energized, the solenoid is energized and engages the nut 66 which then traverses the lead screw 38 which opens the damper. When power is removed, the solenoid resets itself, disengages from the nut, and the damper can automatically close under the force of a spring means 35.

Figure 8:
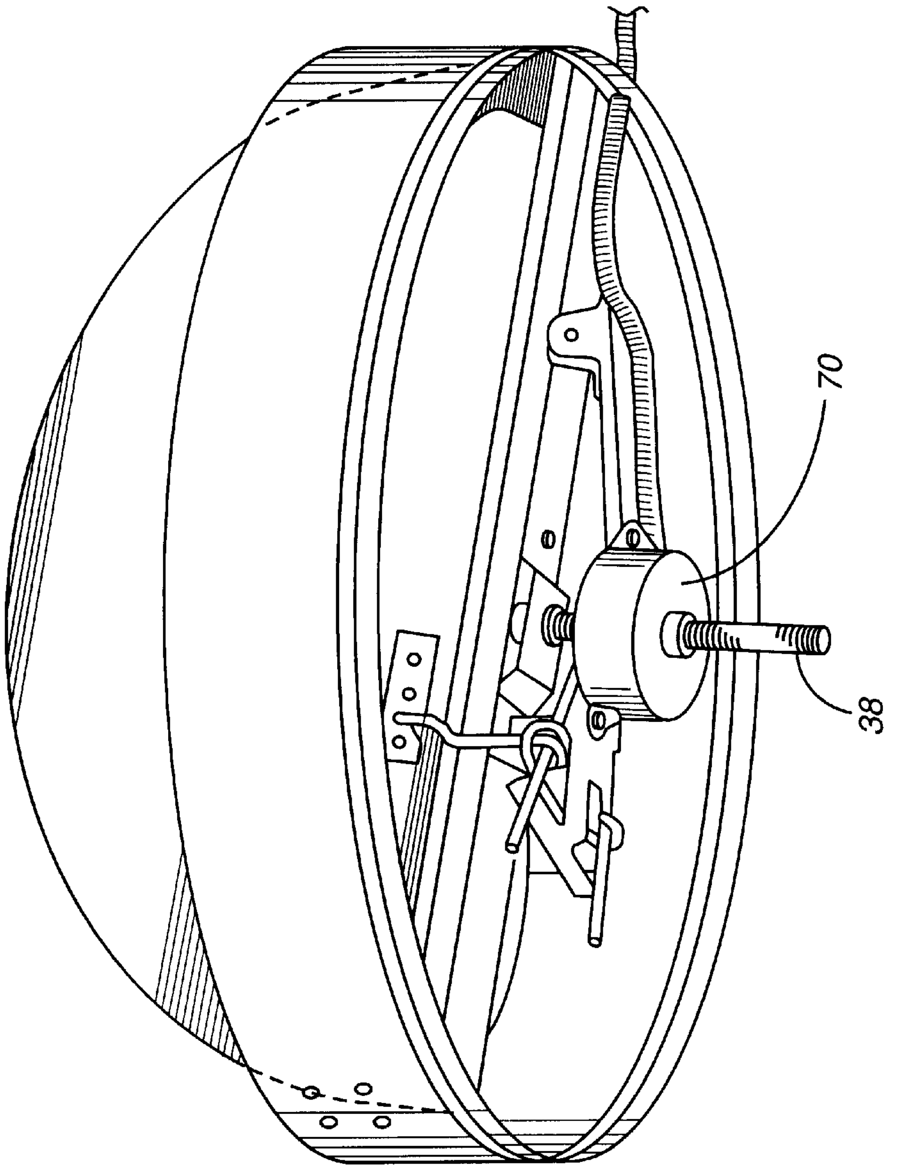
FIG. 8 is a perspective view of another alternate embodiment of my invention.

In the alternate embodiment shown in FIG. 8, the motor 70 is hollow and a nut (not shown) is mounted within the motor. Thus, when the motor armature inside the motor turns, it causes the nut to rotate and the motor traverses with a lead screw 38.

Figure 9:
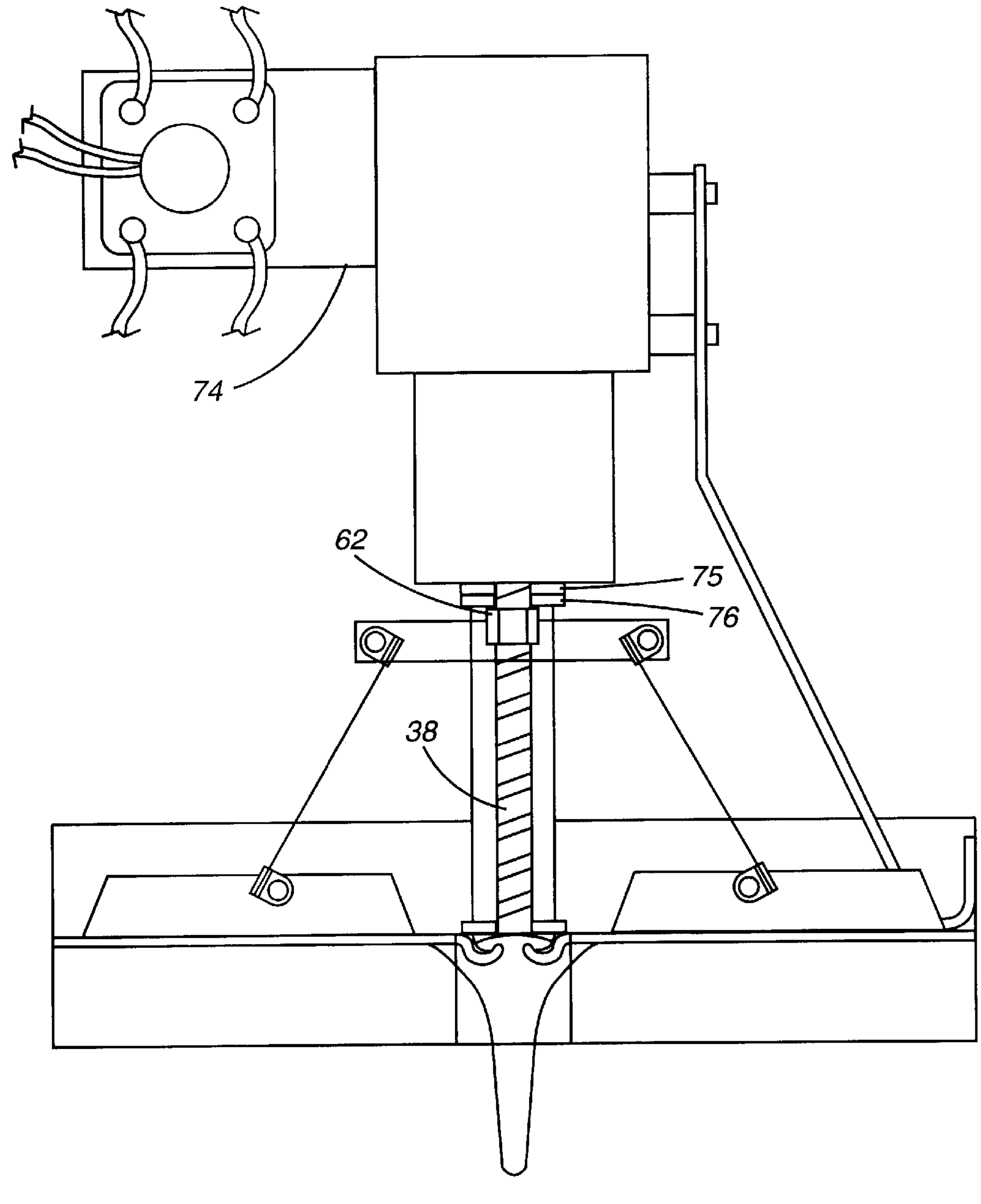
FIG. 9 is an inside vertical elevation of another alternate embodiment of my invention.

The next embodiment is a lead screw butterfly damper, but with an electric clutch means 74; shown in FIG. 9. The lead screw 38 drives the damper by having a nut 62 traverse the lead screw similar to that which was shown in FIG. 6. However, the end of the lead screw is connected to a plate 75 and the shaft of the motor is also connected to another plate 76. These plates are part of an electric clutch such that when electricity is supplied to the clutch, the two plates grab magnetically and drive the shaft. When electricity is removed from the electric clutch, the springs can force the damper closed.

In the above embodiments, the electric powered actuator means most preferably uses an electric DC motor 28. The electric motor is preferably a stepper motor which allows more precise position control of the damper blades.

When stepper motor is activated, it rotates the threaded lead screw shaft 38 which in turn moves the operator means which then moves the damper blades from an open to a closed position, or vice versa. The stepper motor may be used to partially open or close the damper; that is, adjust the position of the blades. When the damper is partially opened or closed under precision control of the stepper motor, the air flow through the damper can modulated. In large buildings, a central computer can use remote sensors to regulate air flow throughout the building by independently controlling each damper.

With respect to the Figures, it should be noted that there are different options with regard to the lead screw nut which may be used.

One option is to have the nut be in two pieces, i.e., split, so that it can be released by spring pressure. In other words, the two pieces can come apart, allowing a spring to close the damper. This could usefully be applied to the embodiments of FIGS. 1 and 2.

Another option is to restrain the outside of the nut; and then have a release mechanism which gets rid of the retention mechanism so that the nut can spin as shown in FIG. 7. The release can be either a bi-metal or a solenoid device.

Note in FIG. 7, a bearing 68 is positioned at the end of the lead screw because the lead screw is the same size and stays there constantly and just turns. The nut rides axially on the lead screw. If the nut is welded to the brace, then the device is useful for modulating.

In the case of power failure, it is desirable to have the nut release from the lead screw. This can be accomplished, for example, by a solenoid attached to one-half of the nut. When the power comes on, the solenoid retracts that half so that the nut is disengaged from the lead screw. Thus, there are three distinct conditions: (1) when the power is always on and the solenoid is always engaged and the damper is powered to a closed position, or opened to a modulated position; (2) when it is desirable to have the damper close automatically, such as by the spring. In that condition, the solenoid removes the half nut whether the motor is actually running or not at that moment; and (3) to simply have the solenoid impinge upon the outside of the nut to keep it from turning.

In the preferred embodiment, the angle of the threads is steeper, so the nut can turn more freely. Indeed it is even preferable to have the nut mounted on a bearing for that purpose.

The angle of the threads on the lead screw must be such that the nut will not ride on its own as a result of associated pressure. Rather, the angle must be such as to be precise in positioning the nut.

Figure 10:
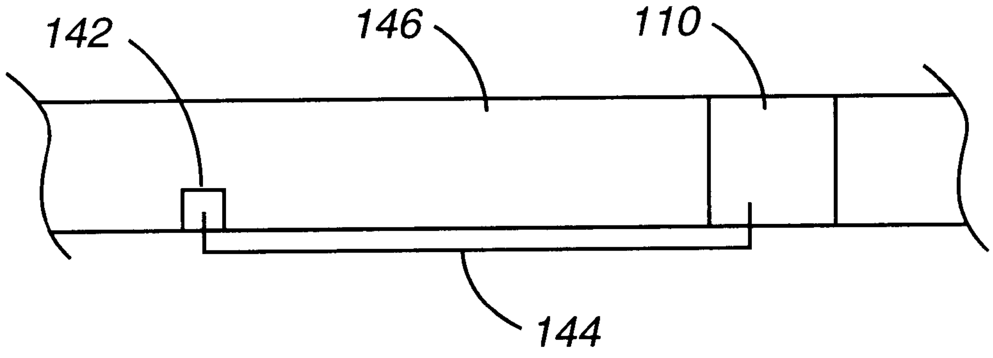
FIG. 10 is a diagrammatic view of an alternate embodiment of my invention.
Figure 11:
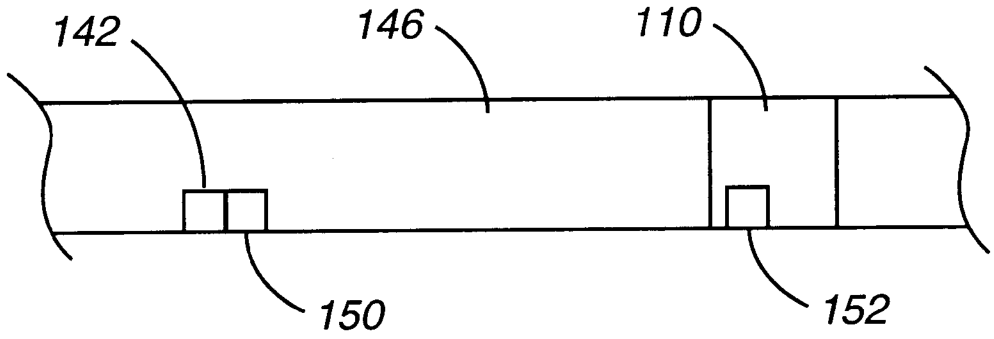
FIG. 11 is another diagrammatic view of another embodiment of my invention.

FIGS. 10 and 11 illustrate other preferred embodiments of the invention which remotely control operation of the powered dampers. In FIG. 10, a remote sensor 142 is attached to damper 110 via hard wiring 144. When remote sensor 142 detects heat or smoke, it signals the power actuator in the damper via wires 144. The damper then closes to prevent smoke or fire from passing through the damper. By locating sensor 142 at a distance from the damper, the damper 110 can close well in advance of the arrival of the smoke or the fire. The sensors can be mounted in or out of the air duct 146.

FIG. 11 illustrates another preferred embodiment of the invention. In this embodiment, the remote sensor 142 includes a radio transmitter 150. When the sensor 142 detects smoke or fire, it signals a receiver 152 which is attached to the damper 110. The receiver 152 notifies the power actuator which, in turn, closes the damper 110. Those skilled in the art will recognize that while the term radio is used, any suitable wireless communications technology may be used to implement this function. This embodiment eliminates the signal wire 144. This can be important because, depending on the location of a fire, the wiring may be damaged by fire before the remote sensor 142 detects the smoke or fire.

While the previous embodiments discussed control of the dampers by powered actuators for use in fire control situations, there are other reasons to control closure of dampers. For example, in manufacturing environments workers may be exposed to toxic fumes from a wide variety of sources. Specialized sensors of any type may be used in the manner previously described, in order to protect workers or occupants of buildings from dangerous fumes. In the case of toxic fumes, early detection of the fumes, along with rapid and secure closure of the dampers, can be extremely important in terms of safety.

In addition, all of the dampers in a given location may be controlled by a central computerized system (not shown) that may use a variety of sensor types including fire, smoke, toxic fumes, vibration (e.g. for use in earthquake prone areas), etc. In addition to centrally controlling the dampers in emergency situations, a central computer can also be used to control damper operation for the purpose of regulating ventilation in a building during normal use. The embodiment which uses a stepper motor is particularly useful for this activity, since it allows for precision control of the position of the damper blades.

Figure 12:
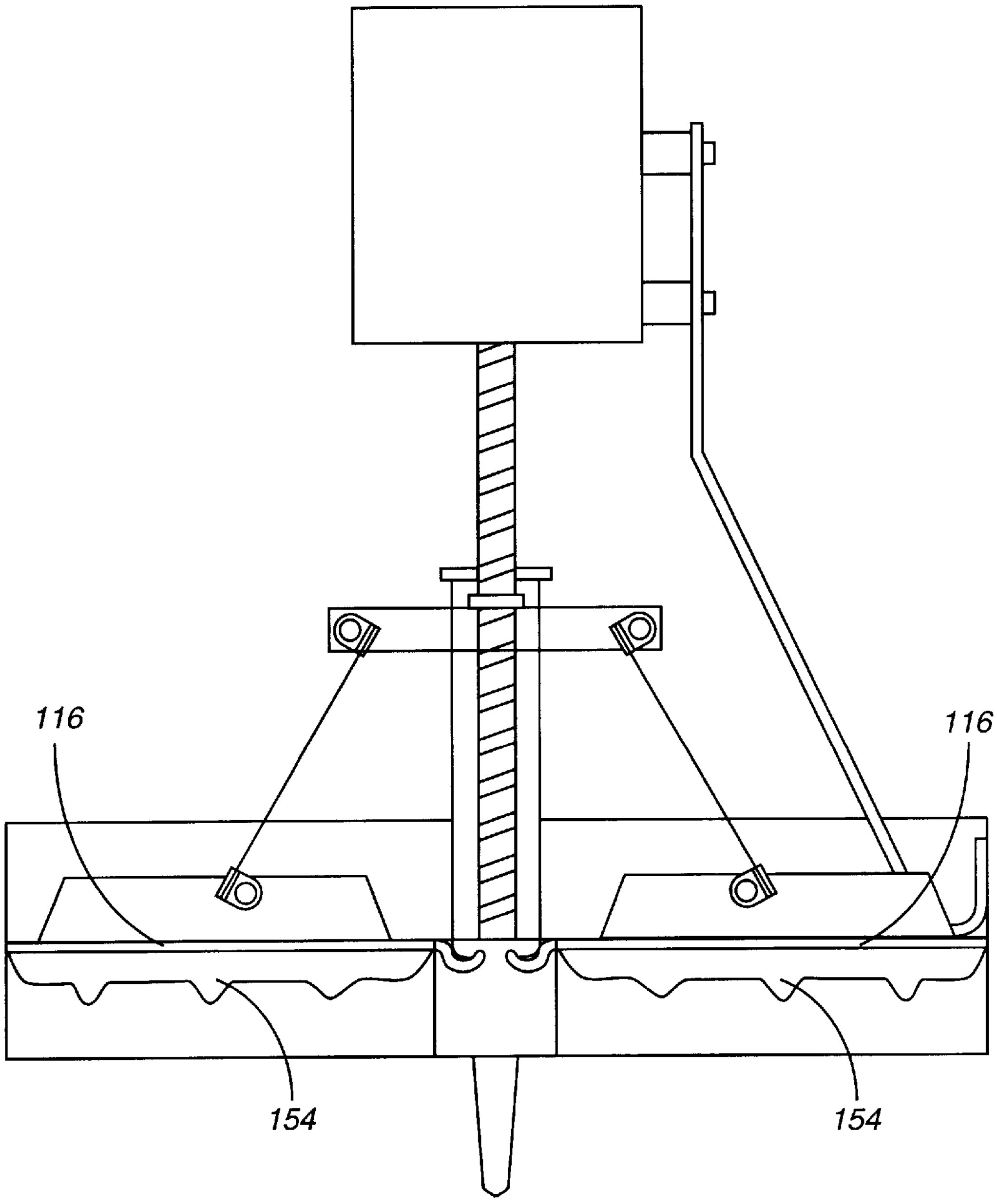
FIG. 12 is an inside elevation of another alternate embodiment of my invention.

In FIG. 12, an optional radiation blanket 154 is illustrated. The radiation blanket 154 is attached to the surface of the damper blades 116. The radiation blanket 154 insulates the damper blades 116 from heat and helps to prevent deformity of the damper blades 116. The radiation blanket 154 can be fabricated from any suitable material which is resistant to the high temperatures found in a fire condition. This works best when the metal blades are exposed to the heat, rather than the insulation 154.

In accordance with my invention, the shaft may engage limit switches for full open and full closed. An override may be provided by a heat sensitive switch; using a nine volt battery on each side. When the heat actuates it, it opens the circuit, thereby reversing polarity and signaling the apparatus to close the damper. The electric lead screw actuator damper must be driven back in order to close the damper. The travel control switches stop travel and arm the reverse D.C. current.

Figure 13:
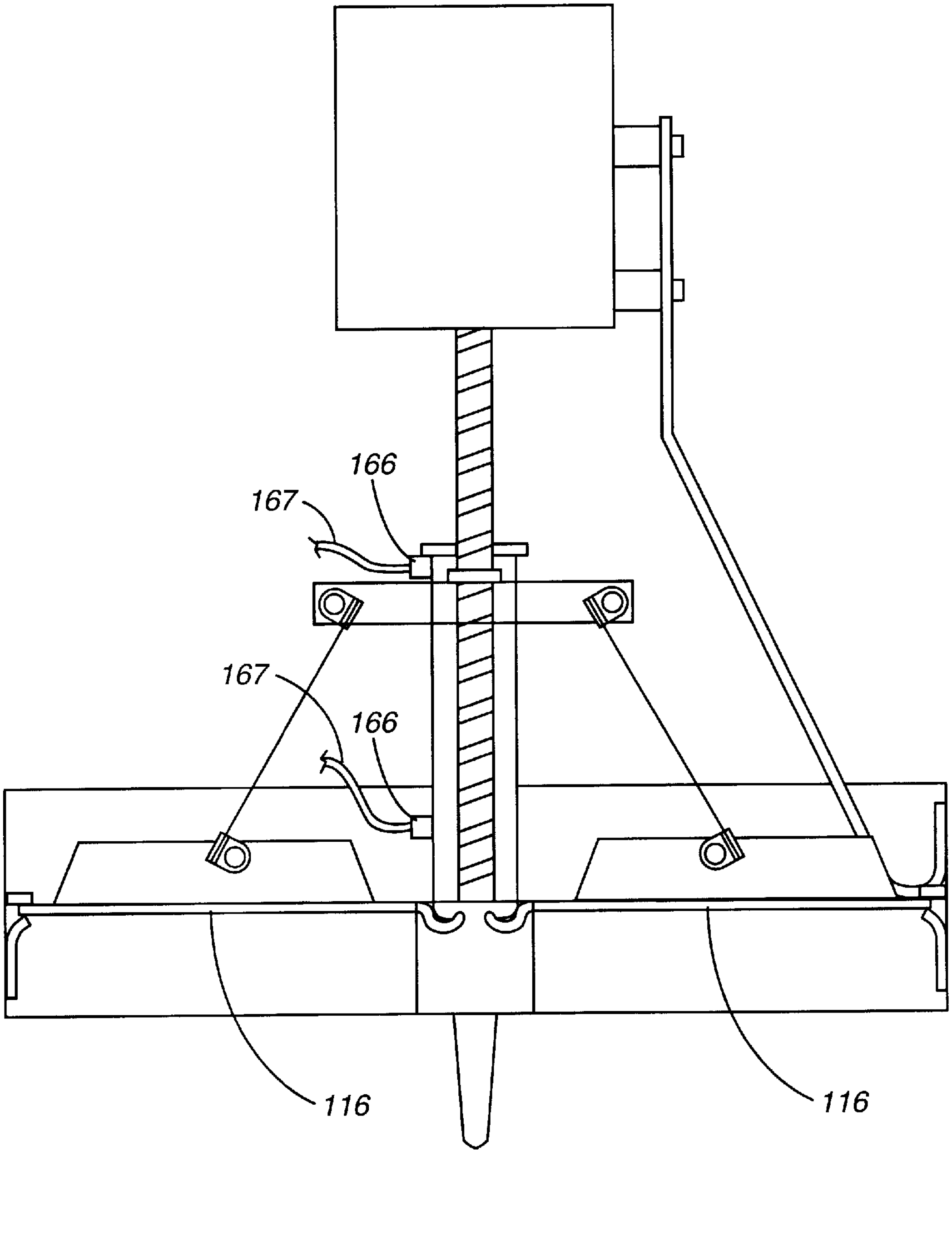
FIG. 13 is an inside elevation of another alternate embodiment of my invention.

FIG. 13 is an inside elevation that illustrates an alternative embodiment in which travel limit switches 166 are used to prevent the actuator from attempting to move the damper blades 116 beyond preset damper blade travel limits. The limit switches may be hard wired as at 167. Travel limit switches 166 prevent damage to the damper blades 116 which may have otherwise occurred, if the actuator erroneously attempted to force the damper blades 116 beyond their intended travel limits. The limit switches may be enclosed with the motor. However, those skilled in the art will recognize that a variety of methods can be used to implement this switching system. The motor may be a Pitman twelve volt D.C.-geared motor.

Figure 14:
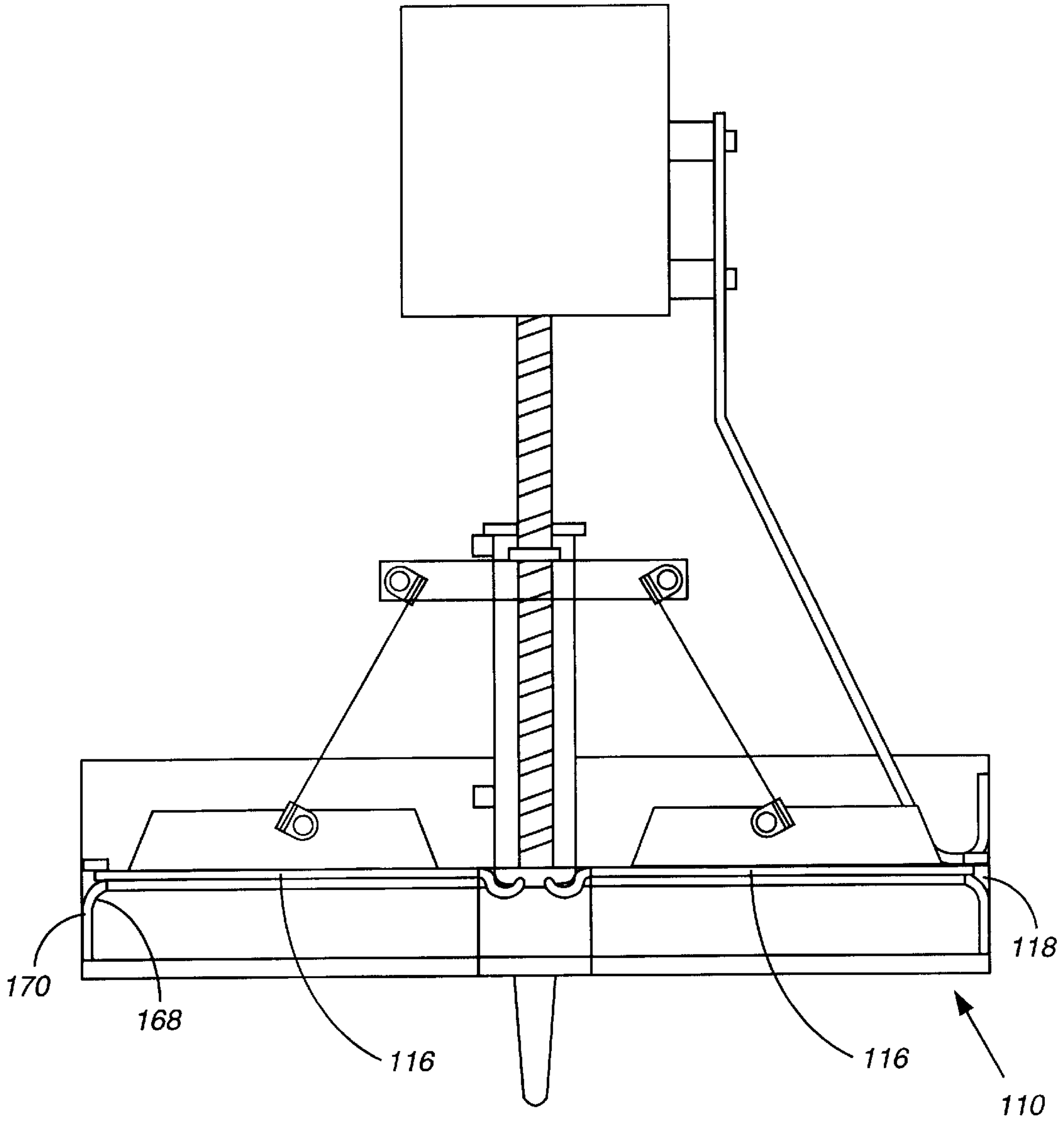
FIG. 14 is an inside elevation of another alternate embodiment of my invention.

FIG. 14 illustrates another alternate embodiment in which a thermal locking means 170 is used to prevent the damper 110 from opening in high temperature conditions. Damper blades 116 are shown pressed against damper blade stops 168 at the end of the locking means 170. The damper blades 116 are locked in the closed position by a thermal lock 170. In the preferred embodiment, thermal lock 170 is fabricated from a bimetallic strip that is attached to damper frame 118. In low temperatures, thermal lock 170 rests flat against the wall of damper frame 118. In that situation, damper blades 116 are free to open and close without interference from thermal lock 170. However, in high temperature conditions the damper blades 116 will be closed by the actuator and press against damper blade stops 168. As the temperature increases, thermal lock 170 bends due to the different expansion rates in metals used to form the bi-metallic strip 170. The bimetallic strip extends away from the damper frame into the path of travel of the damper blades 116 and prevents them from moving back to the open position. An advantage using thermal lock 170 is that it provides an extra measure of protection by ensuring that the damper cannot open in high temperature conditions.

From what has been described, it will be appreciated that I have provided novel powered damper means which can be round, oval or rectangular in configuration; has a two direction lead screw actuating shaft that holds the damper in open, closed or intermediate positions; is responsive to close or open positions by a thermal switch; is easily adjustable to set power and stroke for various size dampers; and is computer driven compatible.

From what I have disclosed, it will be appreciated by those skilled in the art that, in accordance with my invention, there are many such dampers described: electric and pneumatic butterfly and multi-blade.

Further, it would be simple to install a linear motorized (multi-blade or butterfly) modulating exhaust damper for pressure control.

Also, the diffuser mounted damper more readily controls temperature and volume.

While the invention has been described with respect to preferred embodiments thereof, it will be understood by those skilled in the art that various changes in detail may be made without departing from the spirit, scope, and teaching of the invention. For example, the material used to fabricate the damper may be anything suitable for the intended use in conditions of potential fire, smoke, or toxic fumes. The size and shape of the damper may also vary. The number of blades may vary in size, shape or orientation.

What I claim is:

1. An electric power operated damper assembly, comprising:

a damper, having:

a damper frame and at least one damper blade pivotally attached to the damper frame, to regulate the air flow through the damper frame by movement of the blade;

an operator means engaging the damper blade for moving the blade in response to movement of the operator means; and an electric powered actuator means, having a lead screw shaft powered for rotation about its axis; the electric powered actuator means engaging the operator means to cause the operator means to move the damper blade in response to movement of the actuator means;

the powered actuator means further comprising a linkage means having a first portion thereof engaging the lead screw shaft to travel there along in response to axial rotation of the shaft, and a second portion thereof engaging the operator means to move said damper blade in response to movement of said first portion alone said shaft; and wherein the first portion of the linkage means has a gear mounted about the lead screw shaft; and the powered actuator means further comprises a solenoid means having a solenoid having a solenoid shaft movable to an extended and a retracted position; said solenoid being mounted in juxtaposition to said gear, so that in the extended position said solenoid shaft engages said gear and in the retracted position said solenoid shaft does not engage said gear, whereby when said solenoid shaft engages said gear, said gear travels along said lead screw shaft upon rotation of said lead screw shaft about its axis.

2. An electric power operated damper assembly, comprising:

a damper, having:

a damper frame and at least one damper blade pivotally attached to the damper frame, to regulate the air flow through the damper frame by movement of the blade;

an operator means engaging the damper blade for moving the blade in response to movement of the operator means; and an electric powered actuator means, having a lead screw shaft powered for rotation about its axis; the electric powered actuator means engaging the operator means to cause the operator means to move the damper blade in response to movement of the actuator means; and further comprising:

a first blade travel sensor means juxtaposed to the lead screw shaft such that said sensor means notifies the powered actuator when the movable shaft has moved the damper blades to a first position; and a second blade travel switch attached to the movable shaft such that it notifies the powered actuator when the movable shaft has moved the damper blades to a second position.

3. An electric power operated damper assembly, comprising:

a damper, having:

a damper frame and at least one damper blade pivotally attached to the damper frame, to regulate the air flow through the damper frame by movement of the blade;

an operator means engaging the damper blade for moving the blade in response to movement of the operator means; and an electric powered actuator means, having a lead screw shaft powered for rotation about its axis; the electric powered actuator means engaging the operator means to cause the operator means to move the damper blade in response to movement of the actuator means; and further comprising a thermal lock attached to the damper assembly such that said thermal lock does not restrict movement of the damper blades in normal operating conditions and does restrict the movement of the damper blades in high temperature conditions to prevent the damper blades from moving from a closed to an opened position.

* * * * *

UNITED STATES PATENT AND TRADEMARK OFFICE

CERTIFICATE OF CORRECTION

PATENT NO. : 6,557,583 B2
DATED : May 6, 2003
INVENTOR(S) : Francis J. McCabe

It is certified that error appears in the above-identified patent and that said Letters Patent is hereby corrected as shown below:

Column 9,
Line 15, delete "alone" and insert -- along --

Signed and Sealed this

First Day of July, 2003

JAMES E. ROGAN
*Director of the United States Patent and Trademark Office*